July 28, 1959     H. GEORGE     2,897,126
VITREOUS SILICA AND ITS MANUFACTURE
Filed Dec. 2, 1955

INVENTOR.
HENRI GEORGE

United States Patent Office 2,897,126
Patented July 28, 1959

2,897,126

VITREOUS SILICA AND ITS MANUFACTURE

Henri George, Paris, France, assignor to Quartz & Silice S.A., Paris, France, a corporation of France Application December 2, 1955, Serial No. 550,712

Claims priority, application France March 5, 1955

4 Claims. (Cl. 204—130)

My invention relates to the manufacture of vitreous silica, embracing a novel process by means of which a greatly improved glass may be produced.

The most important object of the invention is to improve the light transmission qualities of pure silica glass, particularly in the infra-red and ultra-violet regions.

Another object of the invention is to eliminate certain absorption bands characteristic of conventional silica glass.

Still another object of the invention is to improve the quality of optically useful vitreous silica.

A further object of the invention is to reduce local variations in the index of refraction of silica glass and to eliminate the undesirable "orange peel" effect often displayed by silica glasses.

One important feature of the invention resides in subjecting a piece of silica glass to the combined actions of heat and an electric field to bring about the migration and elimination of certain light-absorbing impurities or lattice defects in the silica glass.

Another feature of the invention consists in processing fine particles of silica to produce silica glass containing no OH ions and displaying satisfactory uniformity in the index of refraction.

Figure 1:
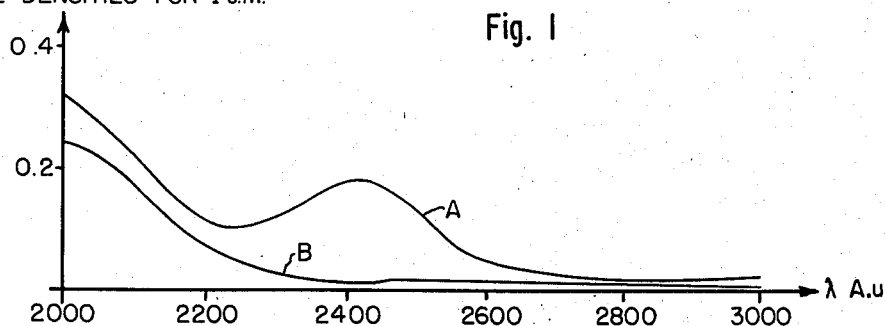
Figure 3:
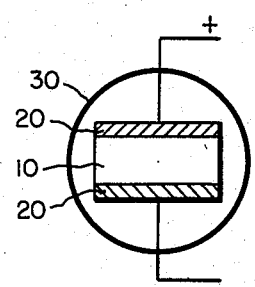
Figure 2:
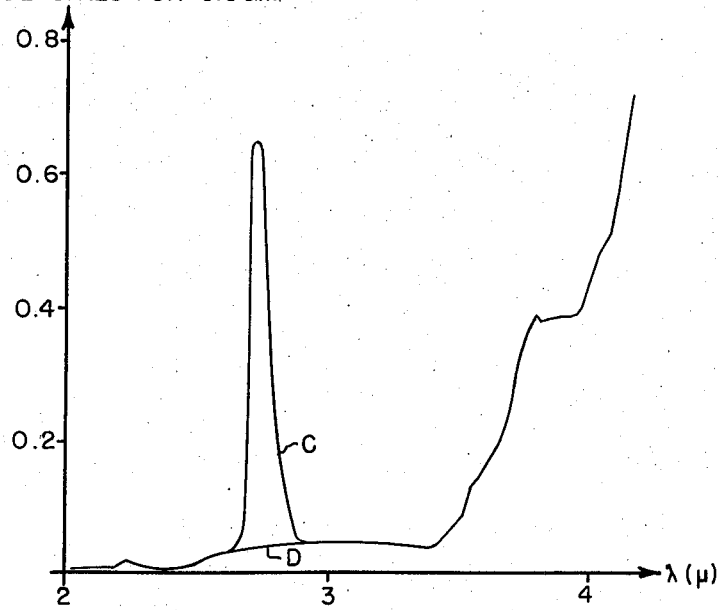

These and other objects and features of the invention will be more readily understood and appreciated from the following detailed description of a preferred embodiment thereof selected for purposes of illustration. The accompanying drawings will be helpful in understanding the process and its results; in them:

Fig. 1 comprises two curves illustrating absorption characteristics of the new product contrasted with conventional vitreous silica, in the range from 2000 to 3000 Angstrom units, Fig. 2 is a pair of similar curves for the region from 2 to about 4.2 microns, and Fig. 3 is a schematic representation of one of the steps in the process of the invention.

In contrast to the usual method of producing pieces of vitreous silica by melting quartz crystals in a flame, I have found it to be necessary to eliminate flame-melting and to provide as the starting material a charge of fine granules or powder, between 200 and 300 mesh. Every precaution must be observed to eliminate impurities. I may derive a powder of pure silica resulting from the oxidation of an organic compound containing silicon, for example ethyl silicate, or I may employ pure quartz crystals, heated, quenched and ground to between 200 and 300 mesh. It is particularly important to inspect the crystals closely and reject those displaying impurities or included water, since the presence of OH ions in the product results in light absorption in the infra-red range. Moreover products of reduction or carburetion are strictly to be avoided.

I prefer to employ the fusion method and apparatus described in my copending application Ser. No. 516,560, filed June 20, 1955, entitled "Process and Apparatus for the Production of Vitreous Silica Articles." The procedure comprises placing the charge in a graphite crucible and heating it very slowly to the melting point while maintaining the crucible under vacuum. The charge melts after several hours to form an ingot from which pieces of desired shape may be cut. If the process is carefully carried out with pure starting material between 200 and 300 mesh in size, there is produced a glass free from the "orange peel" effect. That effect is due to local variations in the index of refraction greater than $10^{-5}$, whereas the new product exhibits no variations greater than $10^{-6}$. The desirable result is believed to be due to the very fine particle size of the starting material.

Another important characteristic of the glass in the ingot is demonstrated in Fig. 2 wherein the curve C depicts the absorption effects between 2 and 4.2 microns (20,000–42,000 Angstroms), while the curve D shows the performance of my novel product. The elimination of the thin but serious absorption band at 2.75 microns represents a striking improvement in transmission of infra-red light. The absence of the absorption band reflects the absence of OH ions in the glass.

The normal absorption band at 2.75 microns is particularly inconvenient when it comes to the manufacture of mercury vapor lamps having silica glass walls, since the output of the lamp is considerably diminished as contrasted with a lamp having a wall formed of the glass of my invention.

After a piece 10 has been cut from the ingot, it is ground as flat as possible at opposed ends and provided with metal electrodes 20, either carefully ground flat plates clamped in place or metal films deposited on the flat ends of the glass. The glass with the electrodes is then placed in a suitable furnace 30 and the electrodes connected to a source of continuous electrical current. The temperature of the furnace is then raised to form 850° to 1300° C. and the D.C. electrical potential adjusted to form 500 volts per centimeter to 1000 volts per centimeter. A satisfactory combination is 1000° C. and 1000 volts per centimeter.

After some time there will be observed a veil or murky band within the glass adjacent the anode, the color thereof corresponding to the process by which the glass was made. The veil slowly migrates through the glass to the cathode end; the speed of migration slackens as the process continues, the average velocity being about one centimeter in 24 hours under the conditions noted. By raising the voltage or temperature the speed can be made to vary.

I have discovered that at temperatures below about 850° C. the desired removal of the absorption band cannot be achieved, although a very slow migration of impurities or structural defects is observed at lower temperatures. As the temperature is raised there is an increase in the rate at which the silica glass devitrifies. It is therefore important to achieve complete migration of the veil of impurities before devitrification is permitted to take place. Therefore the practical upper limit of temperature is about 1300° C.

The size of the piece of silica glass undergoing treatment has a direct effect on the time required for the treatment, the figures used herein being obtained from pieces one centimeter thick. As noted, the speed of migration is not constant, but slows because of space charge effects, the variation of the veil speed being comparable to the variations in the speed of electrons in a vacuum tube.

With respect to the electrical field, the upper limit is set as a practical matter at a value below that at which current will flow through the heated air surrounding the piece. In such cases, employing a conventional voltage source having high internal resistance, the voltage drops at once because of the amount of current required. The temperature does thus have an effect on the voltage limit, 1000 volts per centimeter being the practical upper limit. Moreover, results with a field of less than 500 volts per centimeter do not appear satisfactory. Of course, the voltages here given apply for a piece one centimeter thick. For pieces of other thicknesses the voltages here specified must be multiplied by the distance in centimeters between the opposed surfaces of the electrodes.

At the cathode there is produced an allotropic transformation in the silica glass, under the influence of the electric field and the heat and because of the possible migration of alkaline impurities; the very thin layer of silica glass at the cathode is thus transformed either into quartz (at less than 970° C.) or into cristobalite (at higher temperatures).

The whitened or colored zone at the cathode is ground off at the end of the treatment, and the resultant product not only lacks the "orange peel" appearance and the absorption band at 2.75 microns but also is further improved as shown in Fig. 1. The curve A represents the performance of conventional silica glass, while the curve B displays the characteristics of the product of my invention. It will be seen that in the range from 2000 to 3000 A.U. the overall light absorption has been somewhat reduced and, particularly, the absorption band at about 2450 A.U. (sometimes coming at 2420 A.U.) completely eliminated. The normal absorption band in the ultra-violet region may be demonstrated by using a low-pressure mercury vapor lamp having an intense emission in the region of 2537 A.U.; a sample of conventional silica glass will emit a purple fluorescence under the lamp, while the new glass will exhibit no trace of phosphorescence.

It must also be noted that the fluorescence and absorption reappear when the treated glass is remelted or subjected to temperatures in excess of 1400° C. Consequently objects of silica glass must be placed in almost final form prior to treatment, leaving only mechanical steps for completion, such as grinding or polishing, and particularly excluding remelting or heating above 1400° C.

The combination of treatments described above makes it possible to obtain silica glass presenting only an insignificant absorption in the very great range comprised between extreme ultra-violet, above 2000 A.U., and infra-red up to about 3.5 microns. Thus the new glass is the most transparent available. Its utilization is further made more valuable by reason of its homogeneity.

Having thus disclosed my invention, what I claim as new and desire to secure by Letters Patent of the United States is:

1. The process of treating vitreous silica, comprising heating a block of substantially pure vitreous silica to between 850° C and 1300° C. and imposing a D.C. potential of from 500 v./cm. to 1000 v./cm. across the block until a veil forms in the silica, maintaining these conditions until said veil migrates across said block to the surface of said block.

2. The method of producing vitreous silica having no absorption bands in the ultra-violet or infra-red zones, comprising heating substantially pure vitreous silica to between 850° C. and 1300° C. and subjecting the heated silica to the influence of a D.C. potential of from 500 v./cm. to 1000 v./cm. until a veil forms in the silica and travels to one surface thereof.

3. The method of removing absorption bands at about 2–3 microns or at about 2450 angstroms from substantially pure vitreous silica that has been molded from quartz crystals having no included OH ions and which have been ground to between 200 and 300 mesh and fused without a flame slowly under vacuum; comprising heating the vitreous silica to between 850° C. and 1300° C. and subjecting the heated silica to a D.C. potential of from 500 v./cm. to 1000 v./cm. until a veil forms in the silica and travels to one surface thereof.

4. The method of removing absorption bands at about 2–3 microns or at about 2450 angstroms from substantially pure vitreous silica that has been molded from quartz crystals having no included OH ions and which have been ground to between 200 and 300 mesh and fused without a flame slowly under a vacuum; comprising heating the vitreous silica to between 850° C. and 1300° C. and subjecting the heated silica to a D.C. potential of from 500 v./cm. to 1000 v./cm. until a veil forms in the silica and travels to one surface thereof, and then grinding off that surface.

References Cited in the file of this patent
UNITED STATES PATENTS

| | | |
|---|---|---|
| 1,832,607 | Zworykin | Nov. 17, 1931 |
| 1,955,451 | Blau | Apr. 17, 1934 |
| 1,969,379 | Meissner II | Aug. 7, 1934 |
| 1,969,658 | Mc Ilvaine | Aug. 7, 1934 |
| 1,997,263 | Meissner | Aug. 9, 1935 |
| 2,268,823 | Herzog | Jan. 6, 1942 |
| 2,270,718 | Skaupy | Jan. 20, 1942 |
| 2,504,368 | Wooster et al. | Apr. 18, 1950 |
| 2,561,818 | Peyches | July 24, 1951 |

FOREIGN PATENTS

| | | |
|---|---|---|
| 255,118 | Great Britain | Jan. 6, 1927 |

OTHER REFERENCES

Physical Review, vol. 87, No. 5, 1952, pp. 789–795, article by Hacskaylo et al.